(12) United States Patent
Emerson et al.

(10) Patent No.: US 10,479,522 B2
(45) Date of Patent: Nov. 19, 2019

(54) INTERNAL RECYCLE REACTOR FOR CATALYTIC INERTING

(71) Applicant: Hamilton Sundstrand Corporation, Charlotte, NC (US)

(72) Inventors: Sean C. Emerson, Broad Brook, CT (US); Zissis A. Dardas, Worcester, MA (US); Randolph Carlton McGee, Hamden, CT (US); Eric Surawski, Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 15/934,095

(22) Filed: Mar. 23, 2018

(65) Prior Publication Data

US 2019/0291886 A1     Sep. 26, 2019

(51) Int. Cl.
| | | |
|---|---|---|
| *B64D 37/32* | (2006.01) | |
| *B01J 19/14* | (2006.01) | |
| *B01D 53/86* | (2006.01) | |
| *B01J 19/24* | (2006.01) | |

(52) U.S. Cl.
CPC ......... *B64D 37/32* (2013.01); *B01D 53/8671* (2013.01); *B01J 19/2435* (2013.01); *B01J 19/2485* (2013.01); *B01D 53/8696* (2013.01); *B01D 2257/104* (2013.01); *B01D 2257/80* (2013.01); *B01D 2259/4575* (2013.01); *B01J 19/14* (2013.01); *B01J 2219/2408* (2013.01); *B01J 2219/2432* (2013.01)

(58) Field of Classification Search
CPC ........ B64D 37/32; B64D 37/16; B64D 37/34; B01D 53/8671; B01J 19/14; F02C 7/141

USPC ........................................................ 422/234
See application file for complete search history.

(56) References Cited

U.S. PATENT DOCUMENTS

| 1,789,812 | A | * | 1/1931 | Frazer | ..................... | B01J 23/862 |
| | | | | | | 422/174 |
| 2,756,215 | A | * | 7/1956 | Burgess | .................. | B64D 37/32 |
| | | | | | | 169/12 |
| 2,758,914 | A | * | 8/1956 | King | ......................... | C21D 1/76 |
| | | | | | | 252/372 |
| 2,952,428 | A | * | 9/1960 | Bridgeman | ............ | B64D 37/32 |
| | | | | | | 244/135 R |

(Continued)

FOREIGN PATENT DOCUMENTS

EP    3279092 A1    2/2018

OTHER PUBLICATIONS

Extended European Search Report for EP Application No. 19164884.9, dated Jul. 15, 2019, 8 pages.

*Primary Examiner* — Huy Tram Nguyen
(74) *Attorney, Agent, or Firm* — Kinney & Lange, P.A.

(57) ABSTRACT

An internal recycle reactor for catalytic inerting has a monolithic body having a motive fluid duct, a suction chamber, a mixing region, a reactor section, an outlet, and a recycle passage. The suction chamber includes a suction chamber inlet. The mixing region is configured to receive gaseous fluids from the motive fluid duct and the suction chamber inlet to produce a gaseous mixture. The reactor section includes a catalyst and is configured to receive the gaseous mixture from the mixing region. The outlet is configured to deliver an exhaust gas from the reactor section and the recycle passage is configured to deliver a portion of the exhaust gas to the suction chamber inlet.

17 Claims, 3 Drawing Sheets

(56) References Cited

U.S. PATENT DOCUMENTS

| | | | |
|---|---|---|---|
| 3,847,298 A | 11/1974 | Hamilton | |
| 4,171,947 A * | 10/1979 | Rice | F23C 13/00 |
| | | | 126/91 R |
| 7,694,916 B2 | 4/2010 | Limaye et al. | |
| 7,896,292 B2 | 3/2011 | Limaye et al. | |
| 8,828,344 B2 | 9/2014 | K-WLam et al. | |
| 2004/0163826 A1 | 8/2004 | Spring | |
| 2008/0107571 A1* | 5/2008 | Johnson | C01B 32/50 |
| | | | 422/144 |
| 2008/0128048 A1 | 6/2008 | Johnson et al. | |
| 2012/0325811 A1* | 12/2012 | Hagh | B01D 53/75 |
| | | | 220/88.3 |
| 2017/0328312 A1 | 11/2017 | Walker et al. | |

* cited by examiner

INTERNAL RECYCLE REACTOR FOR CATALYTIC INERTING

BACKGROUND

The present disclosure relates generally to air inerting systems for aircraft and other applications where an inert gas may be required and, more specifically, to catalytic oxidation of fuel.

Aircraft fuel tanks can contain potentially combustible combinations of oxygen, fuel vapors, and ignition sources. Commercial aviation regulations require actively managing the risk of explosion in the vapor space (i.e., ullage) above the liquid fuel in fuel tanks. This can be accomplished by reducing the oxygen concentration in the ullage by displacing the air in the ullage with an inert gas containing less than 12% oxygen. Conventional fuel tank inerting (FTI) methods include air separation module (ASM) methods that utilize hollow fiber membranes to separate ambient air into nitrogen-enriched air, which is directed to fuel tanks, and oxygen-enriched air, which is usually rejected overboard. AMS methods rely on bleed air from a compressor stage of an engine, which is not always available in the desired quantity at sufficient pressure thereby requiring aircraft engines to idle during descent.

SUMMARY

In one aspect, an internal recycle reactor for catalytic inerting has a monolithic body having a motive fluid duct, a suction chamber, a mixing region, a reactor section, an outlet, and a recycle passage. The suction chamber includes a suction chamber inlet. The mixing region is configured to receive gaseous fluids from the motive fluid duct and the suction chamber inlet to produce a gaseous mixture. The reactor section includes a catalyst and is configured to receive the gaseous mixture from the mixing region. The outlet is configured to deliver an exhaust gas from the reactor section and the recycle passage is configured to deliver a portion of the exhaust gas to the suction chamber inlet.

In another aspect, an internal recycle reactor for catalytic inerting includes an ejector and a recycle passage. The ejector includes a motive fluid duct, a suction chamber having a suction chamber inlet, a mixing region, a reactor section, and an outlet. The mixing region is configured to receive gaseous fluids from the motive fluid duct and the suction chamber inlet and to produce a gaseous mixture. The reactor section is positioned to receive the gaseous mixture from the mixing region and configured to react with the gaseous mixture and the outlet is configured to deliver an exhaust gas from the reactor section. The recycle passage extends from the outlet to the suction chamber inlet and is configured to deliver a portion of the exhaust gas to the suction chamber inlet.

In yet another aspect, a method of catalytic inerting includes flowing a reactant gas to a first inlet of an ejector, flowing a portion of an exhaust gas from an ejector outlet to a second inlet of the ejector, mixing the reactant gas with the exhaust gas to produce a gaseous mixture, flowing the gaseous mixture through a catalyst disposed in the ejector, and flowing the exhaust gas from the catalyst to an outlet.

The present summary is provided only by way of example, and not limitation. Other aspects of the present disclosure will be appreciated in view of the entirety of the present disclosure, including the entire text, claims, and accompanying figures.

Figure 1:
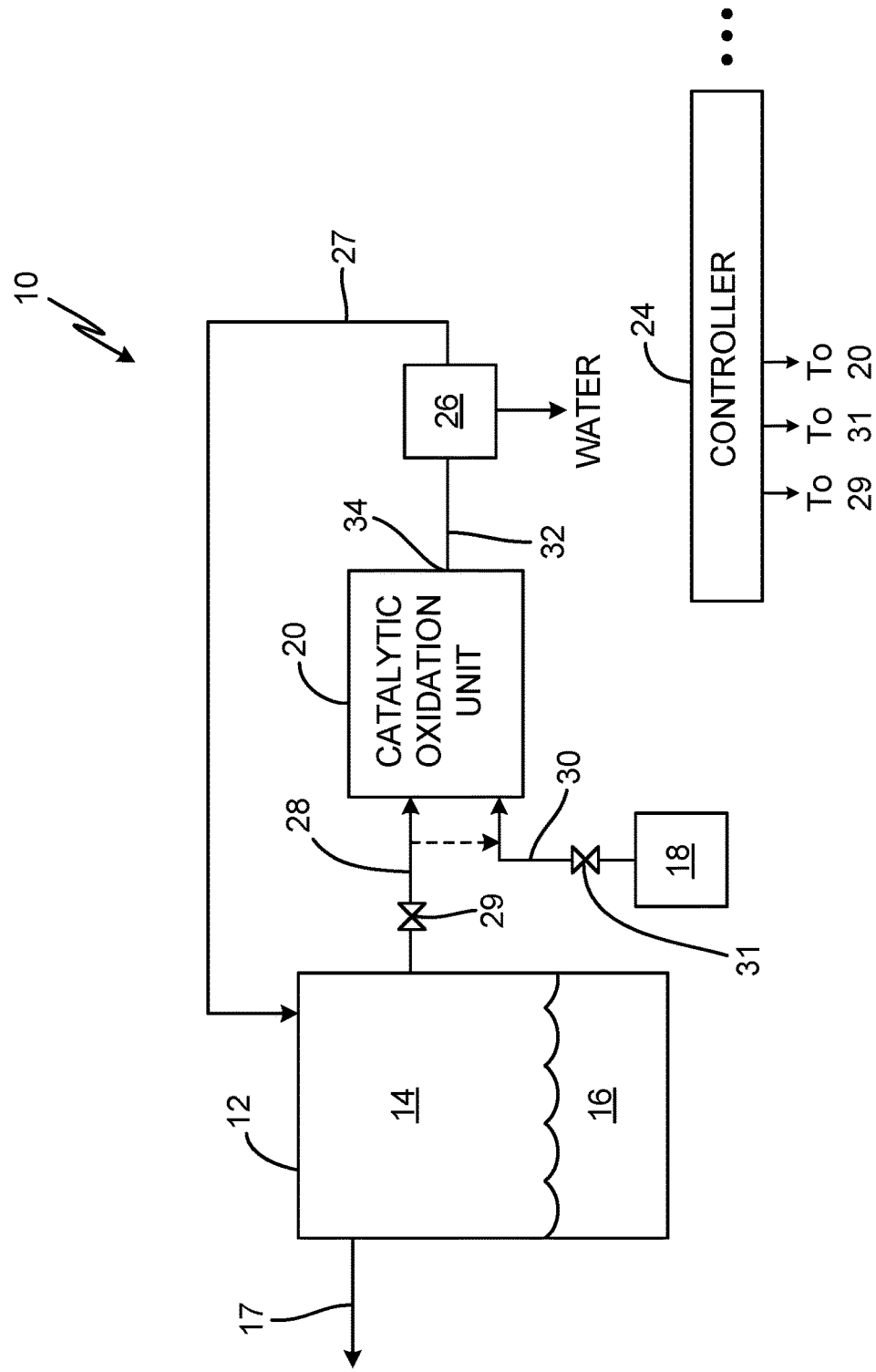
FIG. 1 is a schematic view of an inert gas generating system including an internal recycle reactor for catalytic inerting.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Catalytic oxidation of fuel is an alternative to traditional air separation modules (ASM) used to produce inert air onboard an aircraft for uses such as fuel tank inerting (FTI) and fire suppression. Catalytic oxidation of fuel can leverage a variety of incoming air sources, not limited to bleed air, to produce inert air with oxygen levels below the required 12% oxygen (or 9% for military engines) over a range of conditions. In catalytic oxidation, a catalyst can be used to catalyze a chemical reaction between oxygen ($O_2$) and fuel to produce carbon dioxide ($CO_2$) and water. Catalytic oxidation is an exothermic reaction, which can produce a significant amount of heat. The heat produced must be managed to prevent damage to the oxidizer system and to minimize any hazard to the aircraft. One method to manage the heat within the oxidizer system is to recycle a portion of the oxidizer exhaust back to the inlet of the reactor. The exhaust gas can internally cool the reactor and minimize heat release within the reactor by reducing the amount of oxygen and fuel available for reaction, minimizing the difference between inlet and outlet reactant concentrations, and changing the residence time across the catalyst. One recycle or backmix reactor design uses an external device, such as a blower or ejector (jet pump) to move exhaust from the outlet of the reactor back to the inlet of the reactor. Another design uses an impeller within the reactor to cause internal recirculation. The present disclosure provides an alternative approach in which a catalyst and recycle loop are integrated to form a single body ejector-style reactor, which eliminates the need for an external recycle device.

FIG. 1 is a simplified schematic diagram of inert gas generating system 10, which can be present on-board an aircraft. Inert gas generating system 10 includes fuel tank 12, which includes ullage space 14 above liquid hydrocarbon fuel 16 and at least one vent 17, combustion air source 18 providing combustion air 19 (shown in FIG. 2), catalytic oxidation unit (COU) 20 with internal recycle (shown in greater detail in FIGS. 2 and 3), and controller 24. Inert gas generating system 10 can produce a predominantly inert gas by mixing hydrocarbon fuel 16 and combustion air 19, in the presence of a catalyst (i.e., COU 20). Reaction of hydrocarbon fuel 16 and combustion air 19 produces carbon dioxide and water vapor. The water vapor can be condensed from the exhaust gas exiting COU 20, for example, by heat exchanger 26. The carbon dioxide is an inert gas that is mixed with nitrogen naturally found in fresh/ambient air, and which flows through COU 20 unreacted. The inert gas mixture of carbon dioxide and nitrogen can be directed back to fuel tank 12 via inert gas line 27 to displace gas in ullage 14 and/or can be directed to fire suppression systems (not shown). Controller 24 can be operatively coupled (e.g., electrically and/or communicatively) to components shown in FIG. 1 as well as components not depicted (e.g., valves, sensors, etc.) to control operation of inert gas generating system 10.

Liquid fuel 16 can be kerosene-based jet fuel, such as Jet-A, Jet-A1, or Jet-B fuel. For military applications, liquid fuel 16 can also be a jet propulsion "JP" class fuel, such as JP-5 or JP-8. Other types of fuel such as diesel, gasoline, and mixtures of fuels are also contemplated herein. Ullage space 14, which is a vapor space present above liquid fuel 16 in fuel tank 12, can contain potentially combustible fuel vapors. System 10 operates to reduce the risk of combustion and explosion within ullage space 14 by providing inert gas to maintain the oxygen concentration within ullage space 14 at or below 12% oxygen by volume for commercial aviation, and below 9% by volume for military applications.

In order to operate inert gas generating system 10, fuel 16 can be extracted from fuel tank 12 and delivered to COU 20 via fuel supply line 28. Delivery of fuel 16 to COU 20 can be controlled by one or more valves 29. Fuel vapor 16 can mixed with combustion air 19 prior to entering COU 20 or within a body of COU 20 for reaction in COU 20. In some embodiments, liquid fuel 16 can be directly injected into a gas supply line entering COU 20 (e.g., combustion air supply line 30) or into a body of COU 20 through a fuel injector capable of atomizing fuel 16 for mixture with combustion air 19. In alternative embodiments, fuel vapors 16 in ullage 14 can be separated from a gaseous mixture in ullage 14 or fuel vapor 16 can be produced from liquid fuel 16 in an evaporator container (not shown). Fuel vapor 16 can be delivered to COU 20 in combination with combustion air 19 through a gas supply line, such as combustion air supply line 30. In some embodiments, an additional mixer, such as an ejector or jet pump, can be used to produce a gaseous mixture of fuel 16 and combustion air 19 for delivery to COU 20.

Combustion air 19 provides a source of oxygen for reaction with hydrocarbon fuel 16 in COU 20. Combustion air 19 can be supplied by one or more air sources including, but not limited to, fan bleed air, ram air, cabin outflow air, and compressor bleed air. Combustion air 19 can be supplied to COU 20 through supply line 30. Delivery of combustion air 19 can be controlled by one or more valves 31. In some embodiments, combustion air 19 can be cooled or heated via a heat exchanger or source of heat as known in the art to obtain an optimal inlet gas temperature for reaction in COU 20 (not shown). In some embodiments, a temperature of the gaseous mixture of fuel 16 and combustion air 19 at a COU 20 inlet is between 150° C. and 225° C., but this temperature can vary depending on the type of catalyst used.

COU 20 contains a catalyst capable of inducing a chemical reaction between fuel 16 and combustion air 19. The catalyst material can include, but is not limited to, a noble metal, transition metal, metal oxide, and combinations thereof. The catalyst in COU 20 induces a chemical reaction between fuel 16 and combustion air 19, which produces an exhaust gas containing carbon dioxide, water, and any unreacted gases, which can be delivered from COU 20 through line 32. The reaction is exothermic and, therefore, can also generate a significant amount of heat depending on the amount of reactants available for reaction. The chemical reaction for a stoichiometric mixture of fuel 16 and combustion air 19 has a general formula of:

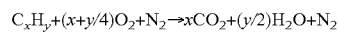

$$C_xH_y+(x+y/4)O_2+N_2 \rightarrow xCO_2+(y/2)H_2O+N_2$$

The exact reactions depend on the type of fuel used and types of hydrocarbons present in the fuel mixture. For a stoichiometric mixture, the reaction results in complete consumption of oxygen and hydrocarbons to produce an inert gas containing carbon dioxide, water, and nitrogen, which exits COU 20 through outlet 34. Any inert gas species (e.g., carbon dioxide, water, and nitrogen) that enter COU 20 in the gaseous mixture of hydrocarbon fuel 16 and combustion air 19 will not react and will thus pass through COU 20 chemically-unchanged. If an oxygen-to-fuel ratio (ratio of oxygen in combustion air 19 to fuel 16) is greater than stoichiometry, or having a stoichiometric ratio greater than 1, more oxygen than needed for reaction of hydrocarbons will enter COU 20. Any unreacted oxygen will exit COU 20 in the exhaust gas. Ideally, the gas returned to fuel tank 12 for inerting of ullage space 14 or directed to fire suppression systems has a minimal or near-zero concentration of oxygen for maximum inerting effect. This is accomplished by having a near-stoichiometric air-to-fuel ratio.

The reaction of fuel 16 and combustion air 19 at near-stoichiometric conditions can result in significant heat release, which can damage COU 20. The amount of heat produced can be managed and reduced by recycling a portion of the exhaust gas through one or more internal recycle passages back to a catalyst inlet.

Figure 2:
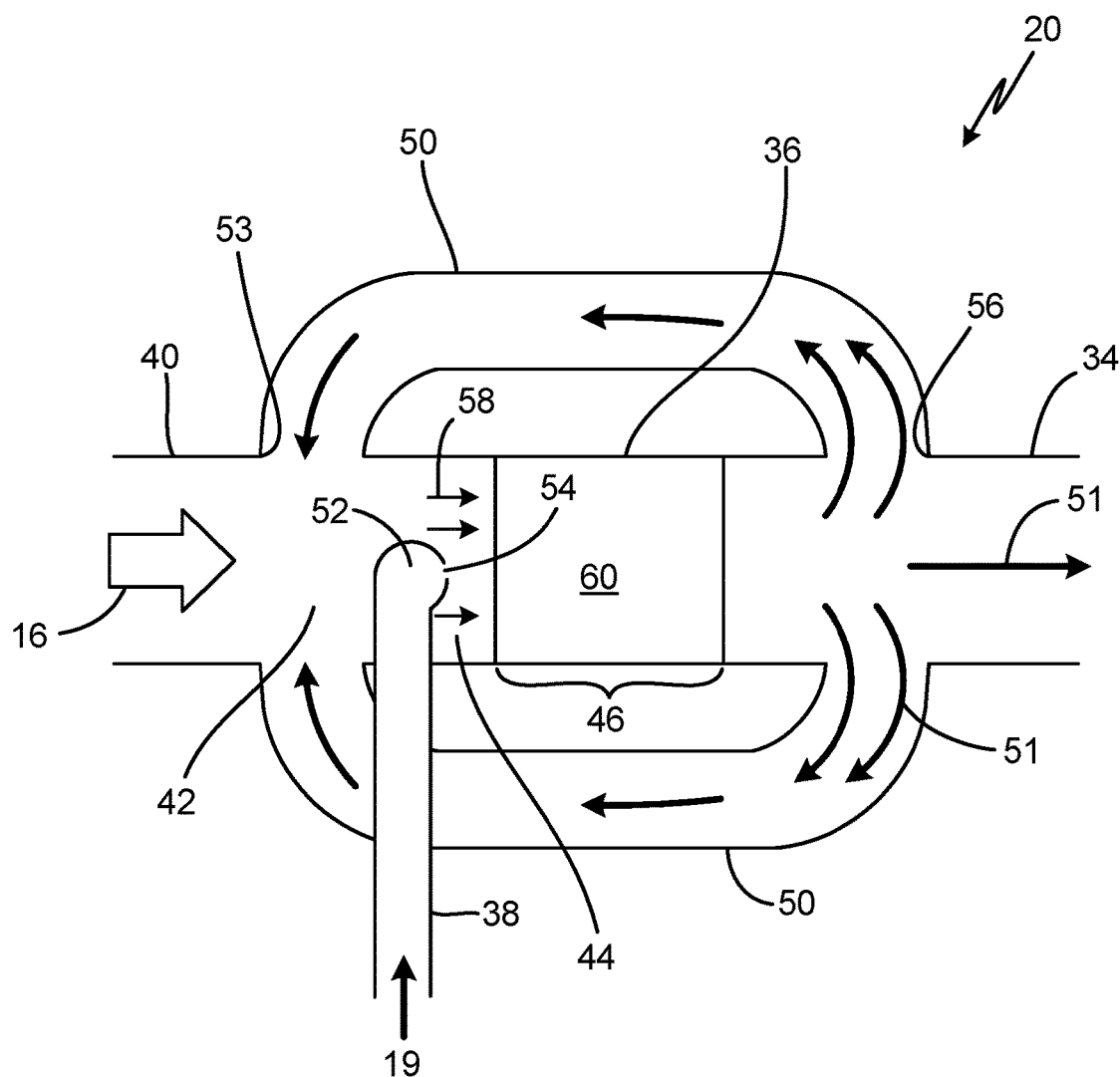
FIG. 2 is a schematic view of one embodiment of the internal recycle reactor of FIG. 1.

FIG. 2 provides a schematic view of one embodiment of internal recycle COU 20. COU 20 includes integrated reactor body 36, motive fluid duct 38, fuel inlet 40, suction chamber 42, mixing region 44, reactor section 46, outlet 34, and recycle passages 50. Motive fluid duct 38 is located upstream of reactor section 46 and configured to deliver a motive flow of combustion air 19 to reactor section 46 for reaction. Outlet 34 (also shown in FIG. 1) is an outlet to reactor section 46 and configured to deliver exhaust gas 51 from reactor section 46 and COU 20. Recycle passages 50 connect outlet 34 with suction chamber inlets 53 upstream of reactor section 46. The motive flow delivered through motive fluid duct 38 draws exhaust gas 51 through recycle passages 50 into suction chamber 42 upstream of reactor section 46. Exhaust gas 51 mixes with combustion air 19 delivered through motive fluid duct 38 and fuel delivered through fuel inlet 40 in mixing region 44. The gaseous mixture produced in mixing region 44 is then delivered to reactor section 46 for catalytic inerting.

Integrated reactor body 36 can include multiple components, which can be integrally formed, removably fastened, fixedly fastened, or manufactured or assembled using combinations thereof. Integrated reactor body 36 can be exposed to high temperatures due to the heat of reaction in reactor section 46. In some embodiments, temperatures may reach or exceed 1200 degrees Celsius. For high temperature applications, integrated reactor body 36 can be made of alloys, such as Inconel 800H/HT, to withstand thermal stresses.

Motive fluid duct 38 includes nozzle 52 configured to direct combustion air 19 to reactor section 46 and to provide a motive flow to create suction in suction chamber 42. Combustion air 19 is supplied by combustion air source 18 (shown in FIG. 1). As previously discussed, combustion air 19 can be a pressurized gas, including but not limited to compressor bleed air. Combustion air 19 can be cooled or heated via a heat exchanger or source of heat as known in the art (not shown) to obtain an optimal inlet gas temperature for reaction in COU 20.

Nozzle 52 can have a converging shape configured to accelerate the flow of combustion air through the nozzle and increase the velocity of combustion air 19. Nozzle 52 can have an outlet orifice 54 opening toward reactor section 46 to direct motive flow to catalyst 60. The high velocity combustion air 19 reduces pressure in suction chamber 42. A pressure differential created across recycle passage 50 causes higher pressure exhaust gas 51 at outlet 34 to enter recycle passage inlet 56 and flow toward lower pressure suction chamber 42. Combustion air 19 enters suction chamber 42 at inlet 53. The pressure differential created by motive fluid duct 38 provides for automatic recycle of exhaust gas 51 without the need for an external blower or pump. Delivery of the combustion air 19 can be controlled by controller 24 and one or more valves to increase or decrease the velocity of combustion air 19 entering COU 20 and thereby recycle of exhaust gas 51.

Fuel 16, supplied by fuel tank 12 (shown in FIG. 1) enters COU 20 via supply line 28 (shown in FIG. 1) and fuel inlet 40. Fuel inlet 40 can be configured to directly inject liquid fuel 16 into mixing region 44 or a region upstream of mixing region 44 via a fuel injector nozzle capable of atomizing liquid fuel 16. Alternatively, fuel vapor 16 can supplied from ullage (shown in FIG. 1) or an evaporator (not shown) via supply line 28 to fuel inlet 40.

Mixing region 44 is immediately upstream of reactor section 46 and is configured to mix combustion air 19, fuel 16, and exhaust gas 51 to produce gaseous mixture 58 upstream of reactor section 46. Gaseous mixture 58 enters reactor section 46 for catalytic reaction.

Reactor section 46 contains catalyst 60. Catalyst 60 can be a monolithic solid body permeable to gaseous mixture 58. In some embodiments, catalyst 60 can have a honeycomb-like structure suitable for providing a reactive surface area as known in the art. Catalyst 60 can consist of noble metals, transition metals, metal oxides, and combinations thereof. Both catalyst 60 and reactor section 46 can be cylindrical in shape with catalyst 60 closely fitted within reactor section 46 to prevent gaseous mixture 58 from bypassing catalyst 60. Catalyst 60 has a cross-sectional area substantially equal to an inner cross-sectional area of reactor section 46 or an outer diameter substantially equal to an inner diameter of reactor section 46. In such configuration, gaseous mixture 58 is forced to flow through catalyst 60. As shown in FIG. 2, catalyst 60 extends a full length of reactor section 46. In a non-limiting example, catalyst 60 can be supported on a metallic or ceramic monolith substrate having a length ranging from 25 mm to 150 mm, diameter of 25 mm to 90 mm, and number of cells per square inch (CPSI) between 200 and 600 (31-93 cells per square centimeter).

As previously discussed, fuel 16 and combustion air 19 react in the presence of catalyst 60 to produce carbon dioxide and water. The addition of exhaust gas 51 can internally cool the reactor and minimize heat release within the reactor by reducing the amount of oxygen and fuel available for reaction, minimizing the difference between inlet and outlet reactant concentrations across catalyst 60, and changing the residence time across catalyst 60. Because the inert gases present in exhaust gas 51 (carbon dioxide, water, and nitrogen) do not react with catalyst 60, no heat is generated by this portion of exhaust gas 51 flowing through catalyst 60. The inert gas passes through catalyst 60 chemically unchanged, although it can absorb heat generated in reaction section 46 by the reaction of fuel 16 and combustion air 19.

Exhaust gas 51 can be recycled at any given or predetermined ratio or percentage. In a non-limiting example, 95% of exhaust gas 51 may be recycled with only 5% being directed to ullage 14 or fire suppression systems. Alternatively, 5% of exhaust gas may be recycled with 95% being directed to ullage 14 or fire suppression systems. These values are merely examples. The amount of exhaust gas 51 recycled can be varied depending on a number of factors, including but not limited to, a desired reactor temperature during steady-state operation. In some embodiments, recycle can be passive with a recycle rate high as possible at all time, generally greater than 20:1. In alternative embodiments, the recycle rate can be controlled by varying the input pressure on an inlet side of the ejector via one or more control valves (e.g., varying the total flow rate of combustion air 19).

Exhaust gas 51 is recycled through recycle passages 50. Although two recycle passages 50 are illustrated, the number of recycle passages 50 can be increased or decreased as appropriate with some embodiments having only one recycle passage 50. Each recycle passage 50 includes inlet 56 and outlet 53 (suction chamber inlet 53). Inlets 56 are positioned at outlet 34 of reactor section 46. Inlets 56 can be evenly distributed about an inner wall of outlet 56 or arranged in any configuration suitable for delivering exhaust gas 51 to an inlet of catalyst 60. Suction chamber inlets 53 can be evenly distributed about an inner wall of suction chamber 42 or can be arranged in any manner suitable to facilitate mixing in mixing region 44. Generally, suction inlets 53 can be perpendicular to nozzle outlet orifice 54. Recycle passages 50 can be made from aluminum, stainless steel, or other material suitable for delivering a pressurized and high-temperature gas. The portion of exhaust gas 51 not recycled through recycle passages 50 is delivered out of COU 20 through outlet 34 for fuel tank inerting and/or fire suppression applications.

Integrated reactor body 36 integrates recycle passage 50 and motive fluid duct 38 into COU 20 in a manner that allows a portion of exhaust gas 51 to be automatically recycled through reactor section 46 without use of an external blower. This has the additional benefit of reducing the number of parts for system 10, as well as reducing the weight and volume of the overall system.

Figure 3:
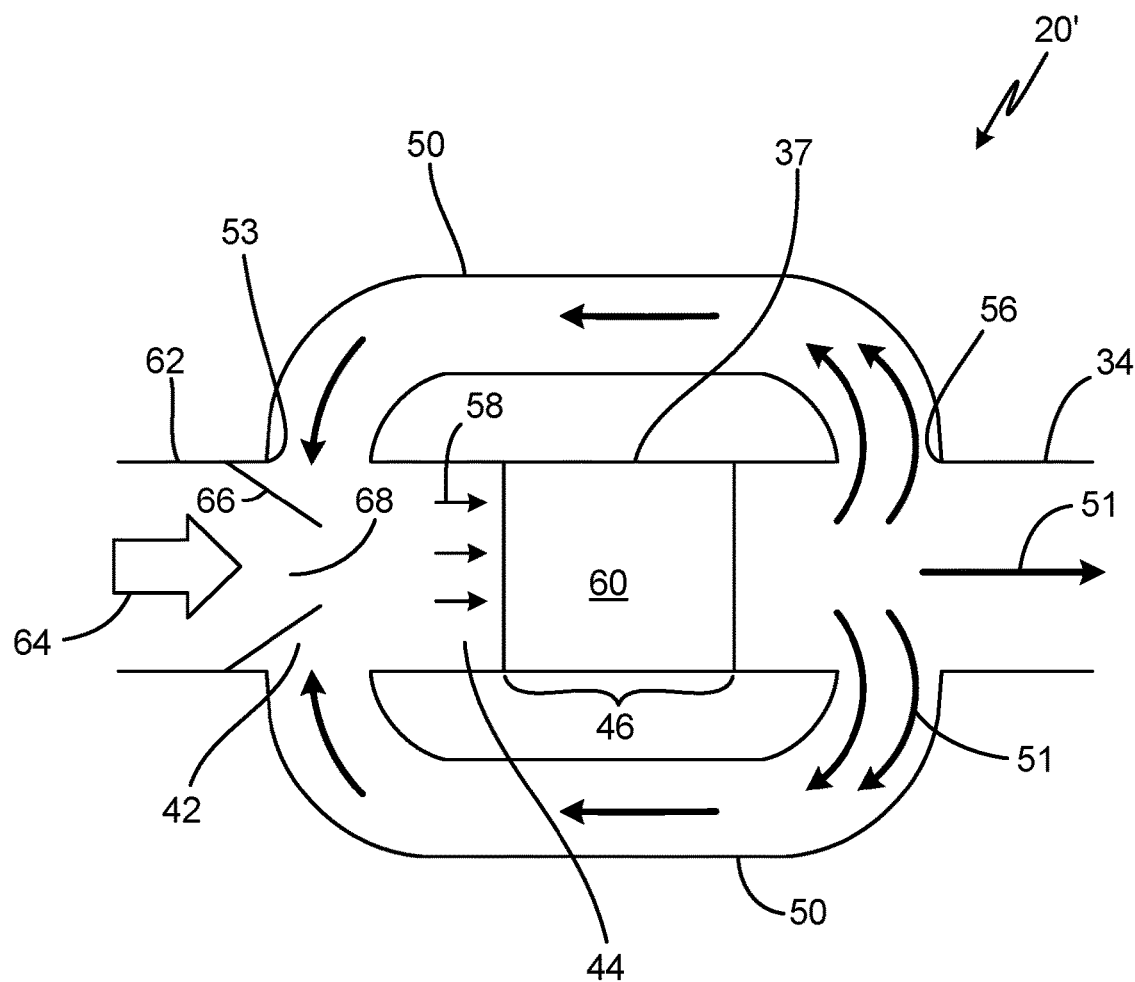
FIG. 3 is a schematic view of another embodiment of the internal recycle reactor of FIG. 1.

FIG. 3 provides schematic views of an alternative embodiment of internal recycle COU 20 of FIG. 1, illustrated as COU 20' in FIG. 3. COU 20' includes integrated reactor body 37, motive fluid duct 62, suction chamber 42, mixing region 44, reactor section 46, outlet 34, and recycle passages 50. Motive fluid duct 62 is located upstream of reactor section 46 and configured to deliver a motive flow of reactant gas 64 to reactor section 46 for reaction. Outlet 34 is an outlet to reactor section 46 and configured to deliver exhaust gas 51 from reactor section 46. Recycle passages 50 connect outlet 34 with suction chamber inlets 53 upstream of reactor section 46. The motive flow delivered through motive fluid duct 62 draws exhaust gas 34 through one or more recycle passages 50 into suction chamber 42 upstream of reactor section 46. Exhaust gas 51 mixes with reactant gas 64 delivered through motive fluid duct 62 in mixing region 44. The gaseous mixture 58 produced in mixing region 44 is then delivered to reactor section 46 for catalytic inerting.

Integrated reactor body 37 is similar to integrated reactor body 36 of FIG. 2 with the exception of the configuration of motive fluid duct 62. Integrated reactor body 37 can include multiple components, including an ejector with motive fuel duct 62, suction chamber 42, mixing region 44, reactor section 46, and outlet 34, and recycle passages 50. These components can be integrally formed, removably fastened, fixedly fastened, or manufactured or assembled using combinations thereof. Integrated reactor body 37 can be exposed to high temperatures due to the heat of reaction in reactor section 46. In some embodiments, temperatures may reach or exceed 1200 degrees Celsius. For high temperature applications, integrated reactor body 36 can be made of alloys, such as Inconel 800H/HT, to withstand thermal stresses.

Motive fluid duct 62 includes nozzle 66 configured to direct reactant gas 64 to reactor section 46 and to provide a motive flow to create suction in suction chamber 42. Nozzle 66 can have a converging shape configured to accelerate the flow of the reactant gas through the nozzle and increase the velocity of the reactant gas. Nozzle 66 can have outlet orifice 68 opening toward reactor section 46 to direct flow to catalyst 60. The high velocity reactant gas reduces pressure in suction chamber 42. A pressure differential created across recycle passage 50 causes higher pressure exhaust gas 51 at outlet 34 to enter recycle passage inlet 56 and flow toward lower pressure suction chamber 42. The reactant gas enters suction chamber 42 at inlet 53. The pressure differential created by motive fluid duct 34 provides for automatic recycle of exhaust gas 51 without the need for an external blower or pump. Delivery of the motive fluid can be controlled by controller 24 and one or more valves to increase or decrease the velocity of the reactant gas entering COU 20' and thereby recycle of exhaust gas 51.

Reactant gas 64 provided as motive fluid in COU 20' is a mixture of fuel 16 and combustion air 19 with a predefined stoichiometric oxygen-to-fuel ratio, delivered through supply lines 28 and/or 30 (shown in FIG. 1). Reactant gas 64 can be cooled or heated via a heat exchanger or source of heat as known in the art (not shown) to obtain an optimal inlet gas temperature for reaction in COU 20'.

Mixing region 44 is immediately upstream of reactor section 46 and is configured to mix reactant gas 64 with exhaust gas 51 to produce gaseous mixture 58 upstream of reactor section 46. Gaseous mixture 58 enters reactor section 46 for catalytic reaction.

Reactor section 46 contains catalyst 60. Catalyst 60 can be a monolithic solid body permeable to gaseous mixture 58. In some embodiments, catalyst 60 can have a honeycomb-like structure suitable for providing a reactive surface area as known in the art. Catalyst 60 can consist of noble metals, transition metals, metal oxides, and combinations thereof. Both catalyst 60 and reactor section 46 can be cylindrical in shape with catalyst 60 closely fitted within reactor section 46 to prevent gaseous mixture 58 from bypassing catalyst 60. Catalyst 60 can has a cross-sectional area substantially equal to an inner cross-sectional area of reactor section 46 or an outer diameter substantially equal to an inner diameter of reactor section 46. In such configuration, gaseous mixture 58 is forced to flow through catalyst 60. As shown in FIG. 3, catalyst 60 extends a full length of reactor section 46. In a non-limiting example, catalyst 60 can be supported on a metallic or ceramic monolith substrate having a length ranging from 25 mm to 150 mm, diameter of 25 mm to 90 mm, and number of cells per square inch (CPSI) between 200 and 600 (31-93 cells per square centimeter).

As previously discussed, fuel 16 and combustion air 19 react in the presence of catalyst 60 to produce carbon dioxide and water. The addition of exhaust gas 51 can internally cool the reactor and minimize heat release within the reactor by reducing the amount of oxygen and fuel available for reaction, minimizing the difference between inlet and outlet reactant concentrations across catalyst 60, and changing the residence time across catalyst 60. Because the inert gases present in exhaust gas 51 (carbon dioxide, water, and nitrogen) do not react with catalyst 60, no heat is generated by this portion of exhaust gas 51 flowing through catalyst 60. The inert gas passes through catalyst 60 chemically unchanged, although it can absorb heat generated in reaction section 46 by the reaction of fuel 16 and combustion air 19.

Exhaust gas 51 can be recycled at any given or predetermined ratio or percentage. In a non-limiting example, 95% of exhaust gas 51 may be recycled with only 5% being directed to ullage 14 or fire suppression systems. Alternatively, 5% of exhaust gas may be recycled with 95% being directed to ullage 14 or fire suppression systems. These values are merely examples. The amount of exhaust gas 51 recycled can be varied depending on a number of factors, including but not limited to, a desired reactor temperature during steady-state operation. In some embodiments, recycle can be passive with a recycle rate high as possible at all time, generally greater than 20:1. In alternative embodiments, the recycle rate can be controlled by varying the input pressure on an inlet side of the ejector via one or more control valves (e.g., varying the total flow rate of combustion air 19).

Exhaust gas 51 is recycled through recycle passages 50. Each recycle passage 50 includes inlet 56 and outlet 53 (suction chamber inlet 53). Inlets 56 are positioned at outlet 34 of reactor section 46. Inlets 56 can be evenly distributed about an inner wall of outlet 56 or arranged in any configuration suitable for delivering exhaust gas 51 to an inlet of catalyst 60. Suction chamber inlets 53 can be evenly distributed about an inner wall of suction chamber 42 or can be arranged in any manner suitable to facilitate mixing in mixing region 44. Generally, suction inlets 53 can be perpendicular to motive fluid duct outlet 319. Recycle passages 50 can be made from aluminum, stainless steel, or other material suitable for delivering a pressurized and high-temperature gas. The portion of exhaust gas 51 not recycled through recycle passages 50 is delivered out of COU 20' through outlet 34 for fuel tank inerting and fire suppression applications.

Integrated reactor body 37 integrates recycle passage 50 and motive fluid duct 62 into COU 20' in a manner that allows a portion of exhaust gas 51 to be automatically recycled through reactor section 46 without use of an external blower.

The ejector-like reactor designs of COU 20 and COU 20' can be used to manage heat generation in catalytic oxidation while eliminating the need for an external recycle device. By placing catalyst 60 inside an ejector body 36, 37, exhaust gas 51 is automatically recycled back through catalyst 60.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like.

Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

An internal recycle reactor for catalytic inerting has a monolithic body having a motive fluid duct, a suction chamber, a mixing region, a reactor section, an outlet, and a recycle passage. The suction chamber includes a suction chamber inlet. The mixing region is configured to receive gaseous fluids from the motive fluid duct and the suction chamber inlet to produce a gaseous mixture. The reactor section includes a catalyst and is configured to receive the gaseous mixture from the mixing region. The outlet is configured to deliver an exhaust gas from the reactor section and the recycle passage is configured to deliver a portion of the exhaust gas to the suction chamber inlet.

The internal recycle reactor of the preceding paragraph can optionally include, additionally and/or alternatively, any one or more of the following features, configurations, and/or additional components:

The internal recycle reactor of the preceding paragraph, wherein the motive fluid duct can include a converging nozzle configured to direct a reactant gas to the reactor section.

The internal recycle reactor of any of the preceding paragraphs, wherein the suction chamber inlet can be disposed perpendicular to an outlet orifice of the nozzle.

The internal recycle reactor of any of the preceding paragraphs can further include a reactant fluid inlet disposed upstream of the catalyst. The motive fluid duct can be configured to deliver a bleed air and the reactant fluid inlet can be configured to deliver a fuel.

The internal recycle reactor of any of the preceding paragraphs, wherein the catalyst can be a solid body permeable to the gaseous mixture and wherein the catalyst fills a cross-sectional area of the reactor section with the cross-section taken along a plane perpendicular to a length of the reactor section.

The internal recycle reactor of any of the preceding paragraphs, wherein the catalyst can fill the cross-sectional area over the entire length of the reactor section.

The internal recycle reactor of any of the preceding paragraphs, wherein the catalyst can comprise a material selected from the group consisting of noble metals, transition metals, metal oxides, and combinations thereof.

An internal recycle reactor for catalytic inerting includes an ejector and a recycle passage. The ejector includes a motive fluid duct, a suction chamber having a suction chamber inlet, a mixing region, a reactor section, and an outlet. The mixing region is configured to receive gaseous fluids from the motive fluid duct and the suction chamber inlet and to produce a gaseous mixture. The reactor section is positioned to receive the gaseous mixture from the mixing region and configured to react with the gaseous mixture and the outlet is configured to deliver an exhaust gas from the reactor section. The recycle passage extends from the outlet to the suction chamber inlet and is configured to deliver a portion of the exhaust gas to the suction chamber inlet.

The internal recycle reactor of any of the preceding paragraphs, wherein the motive fluid duct can include a converging nozzle configured to direct a reactant gas to the catalyst.

The internal recycle reactor of the preceding paragraph can optionally include, additionally and/or alternatively, any one or more of the following features, configurations, and/or additional components:

The internal recycle reactor of the preceding paragraph, wherein the suction chamber inlet can be perpendicular to an outlet orifice of the converging nozzle.

The internal recycle reactor of any of the preceding paragraphs, wherein the catalyst can fill a cross-sectional area of the reactor section to prevent the gaseous mixture from bypassing the catalyst with cross-section taken along a plane perpendicular to a length of the reactor section.

The internal recycle reactor of any of the preceding paragraphs, wherein the catalyst comprises a material selected from the group consisting of noble metals, transition metals, metal oxides, and combinations thereof.

A method of catalytic inerting includes flowing a reactant gas to a first inlet of an ejector, flowing a portion of an exhaust gas from an ejector outlet to a second inlet of the ejector, mixing the reactant gas with the exhaust gas to produce a gaseous mixture, flowing the gaseous mixture through a catalyst disposed in the ejector, and flowing the exhaust gas from the catalyst to an outlet.

The method of the preceding paragraph can optionally include, additionally and/or alternatively, any one or more of the following features, configurations, additional components, and/or steps:

The method of any of the preceding paragraphs, wherein the reactant gas can provide a motive flow that drives the flow of the exhaust gas into the second inlet by suction.

The method of any of the preceding paragraphs, wherein the reactant gas can be a mixture of fuel and air.

The method of any of the preceding paragraphs, wherein the reactant gas can be air and wherein the method further comprises injecting a fuel into the mixing region.

The method of any of the preceding paragraphs can further include reacting the gaseous mixture with the catalyst to produce an inert gas with the exhaust gas comprising the inert gas.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An internal recycle reactor for catalytic inerting that is a monolithic body comprising:
   a motive fluid duct having a motive fluid outlet;
   a suction chamber comprising a suction chamber inlet;
   a reactant fluid inlet;
   a mixing region configured to receive separate gaseous fluids from the motive fluid outlet, the suction chamber inlet, and the reactant fluid inlet to produce a gaseous mixture;

a reactor section comprising a catalyst, wherein the reactor section is configured to receive the gaseous mixture from the mixing region;

an outlet configured to deliver an exhaust gas from the reactor section; and a recycle passage fluidly connecting the outlet to the suction chamber and configured to deliver a portion of the exhaust gas to the suction chamber though the suction chamber inlet.

2. The internal recycle reactor of claim 1, wherein the motive fluid duct comprises a converging nozzle configured to direct a reactant gas to the reactor section.

3. The internal recycle reactor of claim 2, wherein the suction chamber inlet is disposed perpendicular to an outlet orifice of the nozzle.

4. The internal recycle reactor of claim 3, wherein the motive fluid duct is configured to deliver a bleed air and the reactant fluid inlet is configured to deliver a fuel.

5. The internal recycle reactor of claim 3, wherein the catalyst is a solid body permeable to the gaseous mixture and wherein the catalyst fills a cross-sectional area of the reactor section, the cross-section taken along a plane perpendicular to a length of the reactor section.

6. The internal recycle reactor of claim 5, wherein the catalyst fills the cross-sectional area over the entire length of the reactor section.

7. The internal recycle reactor of claim 1, wherein the catalyst comprises a material selected from the group consisting of noble metals, transition metals, metal oxides, and combinations thereof.

8. The internal recycle reactor of claim 1, and further comprising a plurality of recycle passages fluidly connecting the outlet to the suction chamber.

9. An internal recycle reactor for catalytic inerting comprising:

an ejector comprising:
 a motive fluid duct;
 a suction chamber having a suction chamber inlet;
 a mixing region configured to receive gaseous fluids from the motive fluid duct and the suction chamber inlet and to produce a gaseous mixture;
 a reactor section positioned to receive the gaseous mixture from the mixing region and configured to react with the gaseous mixture to form an exhaust gas; and
 an outlet configured to deliver an exhaust gas from the reactor section; and a plurality of recycle passages fluidly connecting the outlet to the suction chamber and configured to deliver a portion of the exhaust gas to the suction chamber through the suction chamber inlet.

10. The internal recycle reactor of claim 9, wherein the motive fluid duct comprises a converging nozzle configured to direct a reactant gas to the catalyst.

11. The internal recycle reactor of claim 10, wherein the suction chamber inlet is perpendicular to an outlet orifice of the converging nozzle.

12. The internal recycle reactor of claim 10, wherein the catalyst fills a cross-sectional area of the reactor section to prevent the gaseous mixture from bypassing the catalyst, wherein the cross-section is taken along a plane perpendicular to a length of the reactor section.

13. The internal recycle reactor of claim 12, wherein the catalyst comprises a material selected from the group consisting of noble metals, transition metals, metal oxides, and combinations thereof.

14. A method of catalytic inerting comprising:

flowing a reactant gas to a first inlet of an ejector;

flowing a portion of an exhaust gas from an ejector outlet to a second inlet of the ejector;

mixing the reactant gas with the exhaust gas to produce a gaseous mixture;

flowing the gaseous mixture through a catalyst disposed in the ejector, wherein the catalyst is disposed in a reactor section of the ejector located between a mixing chamber and the ejector outlet and wherein the catalyst fills a cross-sectional area of the reactor section such that the gaseous mixture is directed through the catalyst;

reacting the gaseous mixture with the catalyst to produce an exhaust gas comprising an inert gas; and flowing the exhaust gas from the catalyst through a plurality of recycle passages, wherein the recycle passages fluidly connect the ejector outlet to the second inlet of the ejector and wherein the reactant gas provides a motive flow that drives the flow of the exhaust gas into the second inlet by suction.

15. The method of claim 14, wherein the reactant gas is a mixture of fuel and air.

16. The method of claim 14, wherein the reactant gas is air and wherein the method further comprises injecting a fuel into the mixing region.

17. The method of claim 14, wherein the catalyst comprises a material selected from the group consisting of noble metals, transition metals, metal oxides, and combinations thereof.

* * * * *